United States Patent
Satish

(10) Patent No.: US 8,370,926 B1
(45) Date of Patent: Feb. 5, 2013

(54) SYSTEMS AND METHODS FOR AUTHENTICATING USERS

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 361 days.

(21) Appl. No.: 12/768,157

(22) Filed: Apr. 27, 2010

(51) Int. Cl.
*G06F 7/04* (2006.01)
*G06F 12/00* (2006.01)

(52) U.S. Cl. ............... 726/19; 726/18; 726/17; 726/21; 726/27; 726/28; 713/155; 713/169; 382/124; 380/270; 455/411

(58) Field of Classification Search .............. 726/17–19, 726/4–6; 713/161–172
See application file for complete search history.

(56) References Cited

U.S. PATENT DOCUMENTS

| | | | | |
|---|---|---|---|---|
| 6,246,769 B1* | 6/2001 | Kohut | ............................ | 380/45 |
| 6,980,081 B2* | 12/2005 | Anderson | .................... | 340/5.53 |
| 7,552,330 B2* | 6/2009 | Kokumai | ...................... | 713/169 |
| 7,587,611 B2* | 9/2009 | Johnson et al. | ............... | 713/186 |
| 7,822,990 B2* | 10/2010 | Varghese et al. | .............. | 713/182 |
| 8,006,300 B2* | 8/2011 | Mizrah | ........................... | 726/20 |
| 8,024,792 B2* | 9/2011 | Zhang et al. | .................... | 726/19 |
| 2002/0075505 A1* | 6/2002 | Murray | ........................ | 358/1.15 |
| 2007/0165849 A1* | 7/2007 | Varghese et al. | ................ | 380/56 |
| 2007/0250920 A1* | 10/2007 | Lindsay | ............................ | 726/7 |
| 2009/0144554 A1* | 6/2009 | Baker | ........................... | 713/183 |
| 2009/0259588 A1* | 10/2009 | Lindsay | ........................... | 705/40 |
| 2010/0107233 A1* | 4/2010 | Dillon et al. | ...................... | 726/7 |
| 2010/0125735 A1* | 5/2010 | Zapata et al. | ................. | 713/170 |
| 2011/0047606 A1* | 2/2011 | Blomquist et al. | ................ | 726/7 |
| 2011/0083181 A1* | 4/2011 | Nazarov | .......................... | 726/23 |

OTHER PUBLICATIONS

L O'Gorman, Comparing passwords, tokens and biometrics, Dec. 2003, IEEE, vol. 91, pp. 5-13.*
Christopher Soghoian; slight paranoia: A Deceit-Augmented Man In The Middle Attack Against Bank of America's SiteKey Service; www.paranoia.dubfire.net/2007/04/deceit-augmented-man-in-middle-attack; taken from site on Mar. 8, 2010.

* cited by examiner

*Primary Examiner* — Nathan Flynn
*Assistant Examiner* — Viral Lakhia
(74) *Attorney, Agent, or Firm* — Advantedge Law Group

(57) ABSTRACT

A computer-implemented method for authenticating users may include identifying an image associated with a user for mutual assurance during an authentication process. The computer-implemented method may also include modifying the image based on a prompt message to create a modified image that displays the prompt message. The computer-implemented method may further include determining that user input comprises an expected response to the prompt message. Various other methods, systems, and computer-readable media are also disclosed.

19 Claims, 11 Drawing Sheets

800

| Password | Prompt Message | Expected Response | |
|---|---|---|---|
| n/a | Wolfgang | Wolfgang | Row 804 |
| Wolfgang | Baseball | WolfgangBaseball | Row 806 |
| Wolfgang | Baseball | BaseballWolfgang | Row 808 |
| Wolfgang | Baseball | Wolfgang-Baseball | Row 810 |
| Wolfgang | Baseball | WolfgangBasebal | Row 812 |
| Wolfgang | Baseball | WolfgangBaseballl | Row 814 |
| Wolfgang | <image of baseball> | WolfgangBaseball | Row 816 |
| Wolfgang | Baseball | WBoalsfegbaanlgl | Row 818 |
| Two | Three | Five | Row 820 |

Password Column 801   Prompt Message Column 802   Expected Response Column 803

FIG. 8

SYSTEMS AND METHODS FOR AUTHENTICATING USERS

BACKGROUND

Computing system administrators, among others, desire to distinguish allowed users from disallowed users. The process of distinguishing an allowed user from a disallowed user may be called user authentication. In contrast, a disallowed user may fail to be authenticated. At that point, the disallowed user may be denied access to the computing or other system.

In addition to computing system administrators authenticating users, users themselves may also desire to authenticate the computing or other system with which they are interacting. The process of providing some level of assurance that both: (i) the user was authenticated to the system and (ii) the system was authenticated to the user may be called mutual assurance.

Mutual assurance may provide some protection against the improper use of computer systems. For example, mutual assurance may provide some protection against phishing attacks. In a phishing attack, a user may be presented with a false login screen that appears to be a login screen for an authentic computing system. The users may then enter their login information without realizing that they are providing the information to those behind the phishing attack. Having received the users' login information, those behind the phishing attack may then obtain access to the computing system.

Some institutions may attempt to provide mutual assurance by displaying an image specified by the user. However, such mutual assurance systems may have various disadvantages. For example, an attacker may be able to acquire the image for use in a phishing attack and may use the image to trick the user into thinking that the phishing site is a legitimate site. Accordingly, the instant disclosure addresses a need for systems and methods that provide mutual assurance in a more effective and efficient manner.

SUMMARY

As will be described in greater detail below, the instant disclosure generally relates to systems and methods for authenticating users. Embodiments of the instant disclosure may protect various systems from various attacks, such as phishing attacks. Embodiments of the instant disclosure may provide mutual authentication between a user and a system during an authentication process. For example, a computer-implemented method for authenticating users may include: 1) identifying an image associated with a user for mutual assurance during an authentication process, 2) modifying the image based on a prompt message to create a modified image that displays the prompt message, 3) displaying the modified image, 4) receiving user input provided in response to the prompt message, 5) determining that the user input comprises an expected response to the prompt message, and 6) authenticating the user based on the determination.

The method may include identifying user-related information. At least one of the prompt message and the expected response may be based on the user-related information. Basing the prompt message on the user-related information may provide an additional level of assurance to the user that the system was authenticated. Basing the expected response on the user-related information may provide an additional level of assurance to the system that the user was authenticated.

The method may further include identifying a password associated with the user. The password may be distinct from the user-related information. The expected response may be based on a combination of the password and the user-related information. The password may provide an additional level of assurance to the system that the user was authenticated.

The expected response may be computed according to any formula given the user password, the prompt message, and/or user-related information. For example, the expected response may be based on at least one of: 1) appending the user-related information to the password and 2) appending the password to the user-related information. The expected response may be based on any other combination and/or modification of the user password, the prompt message, and/or the user-related information.

The method may be separated into a user configuration phase and a user login phase. For example, the method may further include identifying the password during a user configuration phase, displaying the modified image during a user login phase, and receiving the user input during the user login phase. The user configuration phase may occur before the user login phase.

Users may be associated with their corresponding information, including username, password, personal information, and/or challenge-response data. For example, the method may include storing the prompt message and the user-related information in a data structure indicating their pairing.

The prompt message may include any suitable kind of information. The prompt message may include information related to a user (e.g., the user's favorite color) and/or information not specifically related to a user (e.g., the name of the capital city of France). Including the user-related information in the prompt message may provide an additional level of assurance to the user that the system was authenticated.

The mutual assurance image may be displayed selectively upon identifying a user attempt to login to the system using a username corresponding to the mutual assurance image. For example, the method may further include identifying a candidate username and determining that the candidate username comprises a registered username. The registered username may be associated with the mutual assurance image. The mutual assurance image may be displayed in response to the determining that the candidate username comprises a registered username.

The method may use an Optical Character Recognition based CAPTCHA system to provide an additional layer of security. The CAPTCHA system may distinguish human users from non-human users. For example, the method may include displaying the prompt message in a distorted format. Because of the distorted format, non-human users may have difficulty recognizing the prompt message.

The method may use challenge-response questions to provide an additional layer of security. For example, the prompt message may include a challenge question. The expected response may include an answer corresponding to the challenge question. Because the challenge-response question may be based on personal information of the user, attackers may not be able to readily obtain the answers to the question-response questions, and may therefore be blocked from accessing the system.

The user may indicate user input in any manner that conveys the response information to the system. For example, the method may further include displaying a plurality of answer choices. Receiving the user input may include receiving a selection of one of the answer choices. Alternatively, or additionally, the user may indicate input through any one or more of voice, mouse, or other input mediums.

In certain embodiments, a system for authenticating users may include: 1) an image identification module programmed to identify an image associated with a user for mutual assurance during an authentication process, 2) an image modification module programmed to modify the image based on a prompt message to create a modified image that displays the prompt message, 3) a display module programmed to display the modified image, 4) an input module programmed to receive user input provided in response to the prompt message, 5) a determination module programmed to determine that the user input comprises an expected response to the prompt message, 6) an authentication module programmed to authenticate the user based on the determination, and 7) at least one processor configured to execute the image identification module, the display module, the input module, the determination module, and the authentication module.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 8 is a block diagram of exemplary combinations of password, prompt message, and expected answer.

Figure 1:
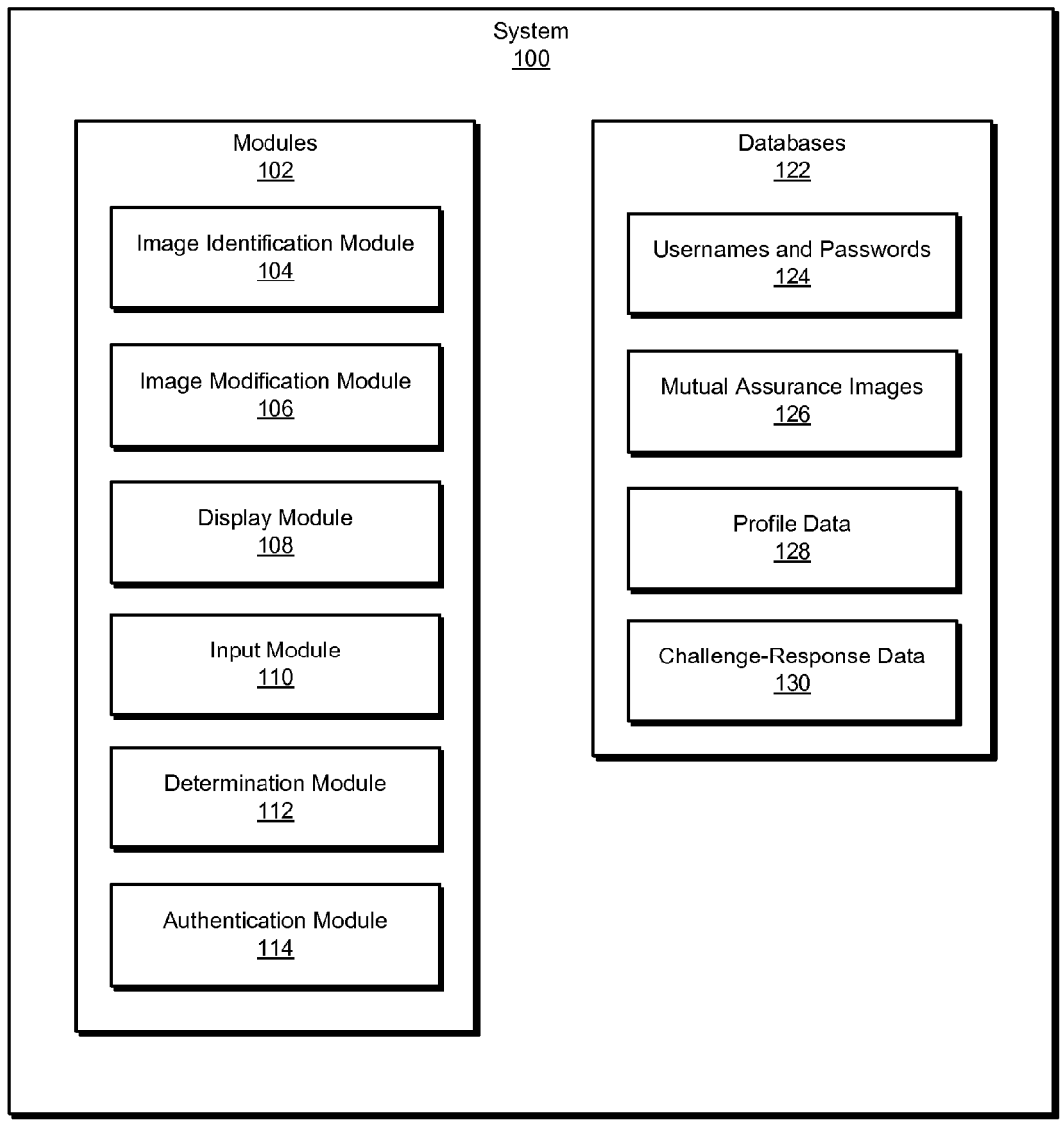
FIG. 1 is a block diagram of an exemplary system for authenticating users.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for authenticating users. In one example, various systems described herein may accomplish this task by: 1) identifying an image associated with a user for mutual assurance during an authentication process; 2) modifying the image based on a prompt message to create a modified image that displays the prompt message; 3) displaying the modified image; 4) receiving user input provided in response to the prompt message; 5) determining that the user input includes an expected response to the prompt message; and 6) authenticating the user based on the determination.

Figure 2:
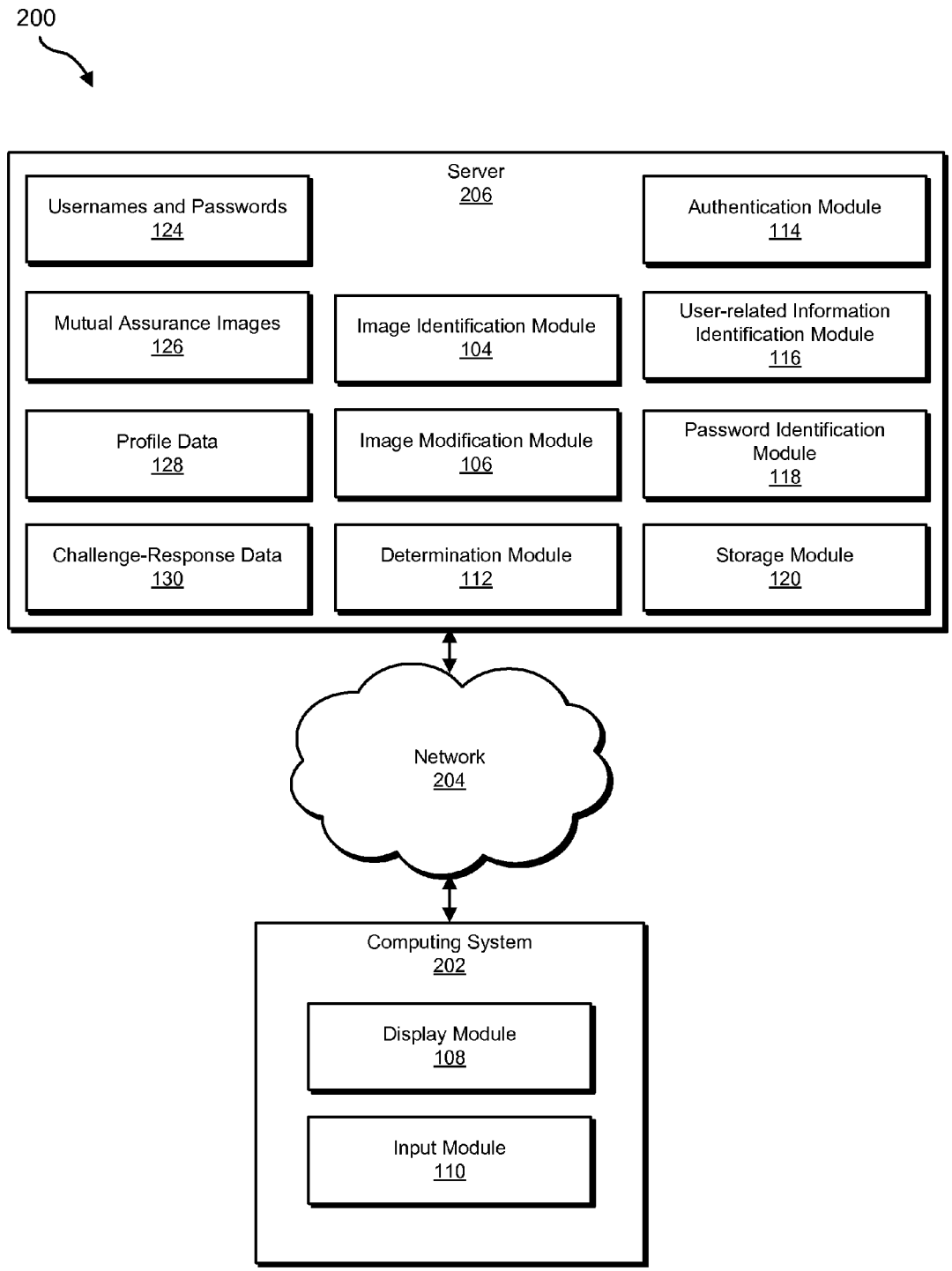
FIG. 2 is a block diagram of another exemplary system for authenticating users.

The following will provide, with reference to FIGS. 1-2, and, detailed descriptions of exemplary systems for authenticating users. Detailed descriptions of corresponding computer-implemented methods will also be provided in connection with FIGS. 3 and 9. Detailed descriptions of exemplary graphical user interfaces are presented in connection with FIGS. 4, 6, and 7, descriptions of an exemplary database are presented in connection with FIG. 5, and descriptions of exemplary combinations of passwords, prompt messages, and answers are presented in connection with FIG. 8. In addition, detailed descriptions of an exemplary computing system and network architecture capable of implementing one or more of the embodiments described herein will be provided in connection with FIGS. 10 and 11, respectively.

FIG. 1 is a block diagram of an exemplary system 100 for authenticating users. As illustrated in this figure, exemplary system 100 may include one or more modules 102 for performing one or more tasks. For example, and as will be explained in greater detail below, exemplary system 100 may include an image identification module 104 programmed to identify an image associated with a user for mutual assurance during an authentication process. Exemplary system 100 may also include an image modification module 106 programmed to modify the image based on a prompt message to create a modified image that displays the prompt message.

Exemplary system 100 may also include a display module 108 programmed to display the modified image. Exemplary system 100 may also include an input module 110 programmed to receive user input provided in response to the prompt message. Exemplary system 100 may also include a determination module 112 programmed to determine that the user input includes an expected response to the prompt message. Exemplary system 100 may also include an authentication module 114 programmed to authenticate the user based on the determination. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or server 206), computing system 1010 in FIG. 10, and/or portions of exemplary network architecture 1100 in FIG. 11. One or more of modules 102 in FIG. 1 may also represent all or portions of one or more special-purpose computers configured to perform one or more tasks.

As illustrated in FIG. 1, exemplary system 100 may also include one or more databases 122. Databases 122 may represent portions of a single database or computing device or a plurality of databases or computing devices. In one embodiment, exemplary system 100 may include a usernames and passwords database 124 for storing usernames and passwords. Exemplary system 100 may also include a mutual assurance images database 126 for storing mutual assurance images. In addition, exemplary system 100 may include a profile data database 128 for storing profile data. Lastly, exemplary system 100 may include a challenge-response data database 130 for storing challenge-response data.

Databases 122 in FIG. 1 may represent a portion of one or more computing devices. For example, databases 122 may represent a portion of server 206 in FIG. 2, computing system 1010 in FIG. 10, and/or portions of exemplary network architecture 1100 in FIG. 11. Alternatively, databases 122 in FIG. 1 may represent one or more physically separate devices capable of being accessed by a computing device, such as server 206 in FIG. 2, computing system 1010 in FIG. 10, and/or portions of exemplary network architecture 1100 in FIG. 11.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with a server 206 via a network 204. Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 1010 in FIG. 10, or any other suitable computing device.

Server 206 generally represents any type or form of computing device which, in combination with computing system 202, may perform the methods disclosed in the instant disclosure. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 1100 in FIG. 11, or the like. Network 204 may facilitate communication or data transfer using wireless or wired connections. In one embodiment, network 204 may facilitate communication between computing system 202 and server 206.

Although depicted as residing in server 206, several modules shown in FIG. 2 may alternatively reside in computing system 202. For example, one or more of databases 124-130 and modules 104-120 may alternatively reside in computing system 202.

Figure 3:
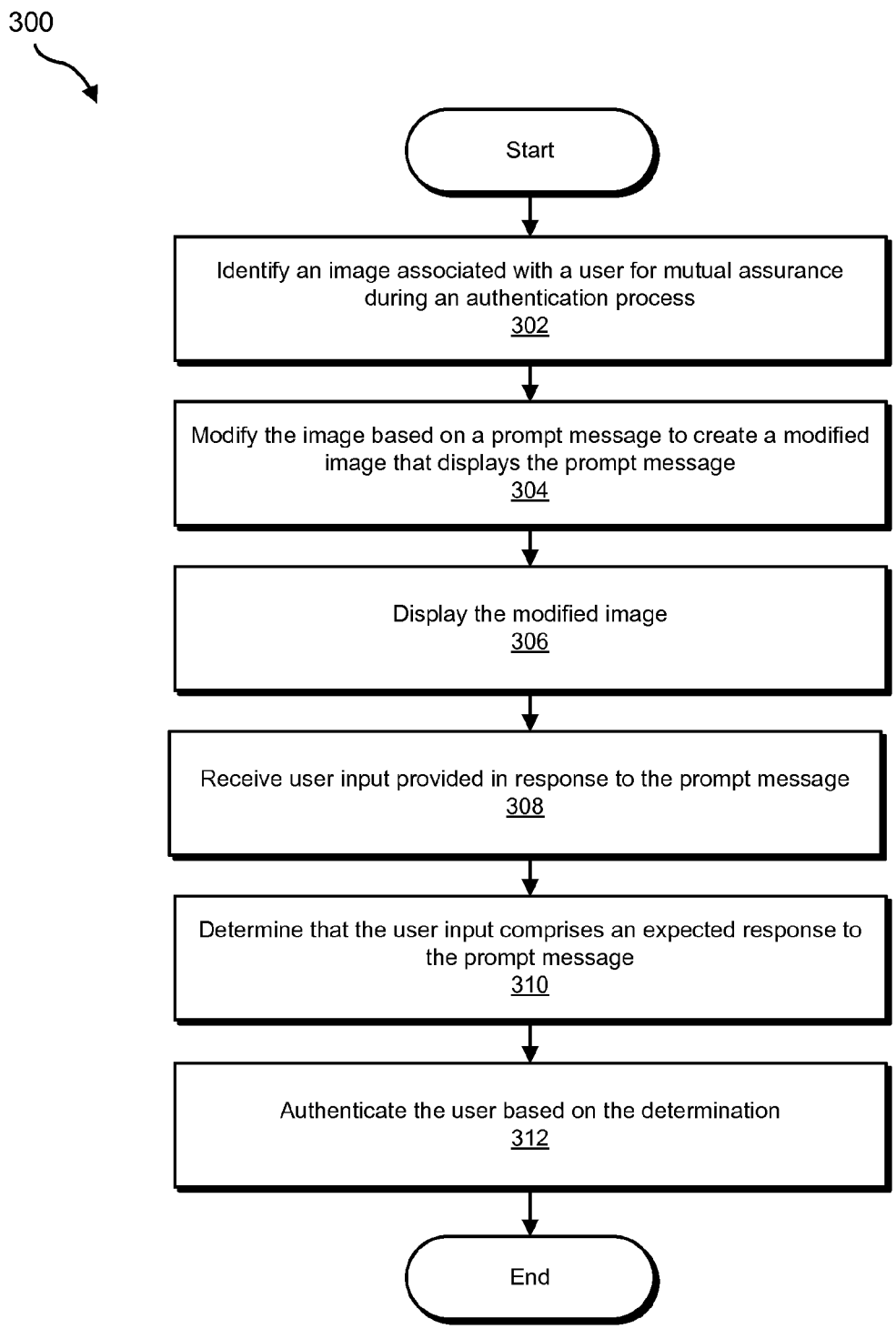
FIG. 3 is a flow diagram of an exemplary method for authenticating users.

FIG. 3 is a flow diagram of an exemplary computer-implemented method 300 for authenticating users. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify an image associated with a user for mutual assurance during an authentication process. For example, at step 302, image identification module 104 may, as part of server 206, identify one of mutual assurance images 126. A mutual assurance image may include any image that helps authenticate a system to a user.

Image identification module 104 may perform step 302 in a variety of ways. For example, image identification module 104 may allow the user to select the mutual assurance image from a displayed collection of possible mutual assurance images. Alternatively, image identification module 104 may automatically designate, specify, obtain, or generate a mutual assurance image. Image identification module 104 may then associate the mutual assurance image with a user. In general, image identification module 104 may perform any function that identifies an image associated with a user for mutual assurance during an authentication process.

Image identification module 104 may identify the mutual assurance image during a profile setup phase. Alternatively, the user may setup a profile and then later select a mutual assurance image.

Figure 4:
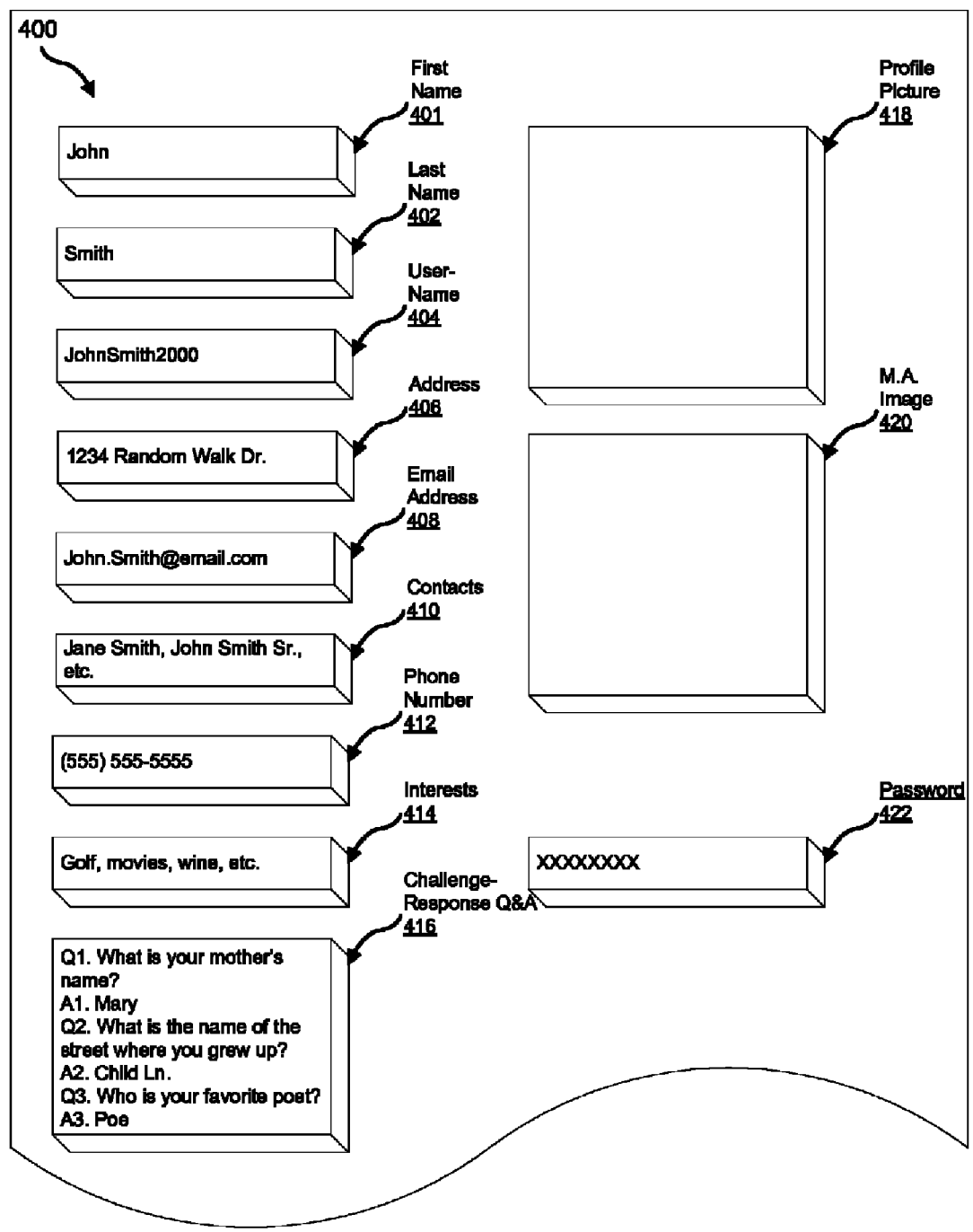
FIG. 4 is an exemplary graphical user interface for setting up a user profile.

FIG. 4 is an exemplary graphical user interface 400 for setting up a user profile. As shown in FIG. 4, a user may set up a profile by entering a first name into a first name field 401, a last name into a last name field 402, a username into a username field 404, an address into an address field 406, an email address into an email address field 408, contacts into a contacts field 410, a phone number into a phone number field 412, interests into an interests field 414, and/or challenge-response questions and answers into a challenge-response questions and answers field 416. The user may also enter a password in a password field 422. A user-related information identification module 116, as shown in FIG. 2, may identify the user-related information in the profile such as the user's first name, last name, address, email address, contacts, phone numbers, interests, and challenge-response question and answer data. A password identification module 118, as shown in FIG. 2, may identify the user's password.

In response to the user's entry of a candidate username in username field 404 and password in password field 422, system 100 may determine whether the username is a proper username. For example, system 100 may determine whether the username was already used. System 100 may also determine whether the username and/or password satisfy the system's rules for username format (e.g., that the username contains a sufficient number and combination of letters, numbers, and symbols). If system 100 determines that the username and password satisfy all of the requirements, such as the above listed requirements, then the system may allow the user to obtain the particular username and password. Also, the user's email address, as entered in email address field 408, may serve as the user's username.

The user may enter a number of contacts into contacts field 410. These contacts may be users that are also registered with system 100. Alternatively, these contacts may be not registered with system 100. In that case, the contacts may be identified by identifiers that are not specific to system 100, such as their email addresses. System 100 may also include fields for the user to designate the relationship that the user has with each contact (e.g., brother, friend, coworker, etc.).

Similarly, the user may enter one or more interests into interests field 414. These interests may represent the user's unique or individual tastes or hobbies. For example, in FIG. 4, the user has designated golf, movies, and wine, as interests.

The user may enter a number of challenge-response questions and answers in challenge-response questions and answers field 416. Alternatively, system 100 may designate the challenge-response questions and the user may provide only the answers. Alternatively, the user may designate the number of the questions while system 100 designates the content of the questions. In general, the user and system 100 may share in the creation of the challenge-response questions and answers. The user may provide a unique part of the challenge-response questions and answers to enable system 100 to authenticate the user in a later authentication process.

Challenge-response questions and answers may generally be any questions and answers that help to authenticate the user. For example, the questions may involve personal details about the user that are not readily available. These may include questions about the person's place of birth, interests, favorites, family, childhood, and/or other personal information.

For example, in a profile setup phase, system 100 may prompt the user to enter the name of the street on which the user grew up in field 416. After the user has provided the answer to that question in field 416, system 100 may later, in a user authentication phase, use that combination of question and answer as challenge-response data for authenticating the user. As an example, system 100 may prompt the user to enter the name of the street on which the user grew up. If, during the user authentication phase, the user correctly answers the same answer as entered into field 416 during the profile setup phase, then the user may be authenticated. If the user fails to enter the same answer as entered into field 416, then the user may be disallowed from using system 100.

Figure 6:
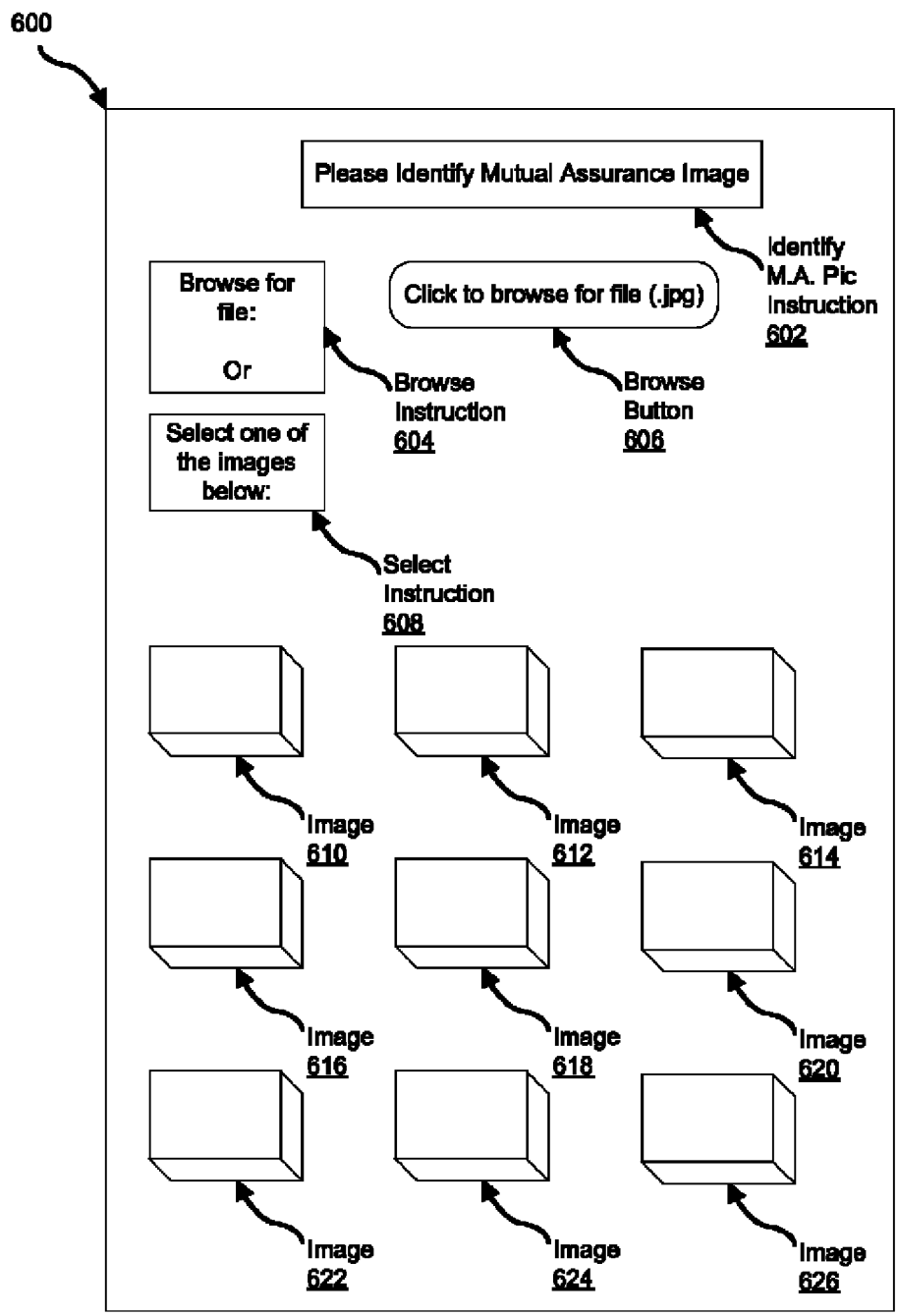
FIG. 6 is a block diagram of an exemplary graphical user interface for selecting a mutual assurance image.

The user may also enter, input, or designate a profile picture using a profile picture field 418. For example, when the user selects profile picture field 418, a dialogue box may appear that allows the users to select a picture file, such as a JPEG file, from the user's computer (or elsewhere, including the web). Alternatively, when the user selects profile picture field 418, system 100 may present the user with a variety of possible profile pictures and allow the user to select at least one. FIG. 6 shows a similar interface for selecting a mutual assurance image, and is discussed in more detail below.

FIG. 4 shows an interface 400 that includes a large number of fields for completeness. In other embodiments, however, interface 400 may not include several of these fields and the user may not enter the corresponding data. For example, contacts field 410 and interests field 414 may be more relevant to a social networking website (e.g., FACEBOOK, MYSPACE), than to a business website (e.g., an online bank). Similarly, other embodiments may not request that the user enter personal information such as the user's first and last name, address, phone number, email address, and challenge-response questions and answers. For example, in some embodiments the user may enter only a password corresponding to the user's email address and may designate or receive a mutual assurance image (as discussed below in the description of FIG. 6).

Instead of presenting each of fields 401-422 in FIG. 4 to the user at the same time in a single graphical user interface 400, these fields may be presented to the user one at a time (e.g., using a profile setup wizard), several at a time, or in any other combination.

Using graphical user interface 400, the user may also designate a mutual assurance image using a mutual assurance image field 420. FIG. 6 shows a graphical user interface 600 for designating a mutual assurance image. System 100 may present graphical user interface 600 when the user selects mutual assurance image field 420 in FIG. 4.

Interface 400 may present an instruction 602 to identify a mutual assurance image. Instruction 602 may be followed by two further instructions, browse instruction 604 and select instruction 608, informing users that they may either (i) select a mutual assurance image by browsing for a file (e.g., on their computer or elsewhere, e.g., the web) or (ii) select a mutual assurance image from a displayed collection of mutual assurance images. For example, select instruction 608 may inform users that they may select one of the images 610-626 as the mutual assurance image.

Instead of simply browsing for a file or selecting one of the images 610-626, the user may generate (e.g., draw or paint) a new image. Alternatively, the user may edit or modify one or more of images of 610-626 and an image identified by a browse field 606. The mutual assurance image may also be generated based on any of the information entered into the user profile (e.g., the fields 401-418 shown in FIG. 4). For example, the mutual assurance image may be generated based on the user's answer to a challenge-response question. If the user designated "Poe" as the user's favorite poet, then the system could generate an image of the word "Poe" or an image of Edgar Allen Poe, as the mutual assurance image. The mutual assurance image could also be based on any of the interests designated in the user's profile (e.g., golf, movies, wine).

As noted above, the mutual assurance image may be selected in the same manner as the profile picture (e.g., as shown in FIG. 6). The mutual assurance image and the profile pictures may also be one and the same (e.g., serve the same functions or the functions of both).

Alternatively, the mutual assurance image may be automatically generated by image identification module 104 and associated with the user. For example, image identification module 104 may automatically select a random image from the collection of images 610-626 and designate the image as the mutual assurance image for the user. Image identification module 104 may also randomly edit or modify one or more of images 610-626 and/or other images (e.g., images from the web) to generate a mutual assurance image. Image identification module 104 may also generate or modify images in a non-random manner (e.g., by simply concatenating two images together).

Figure 5:
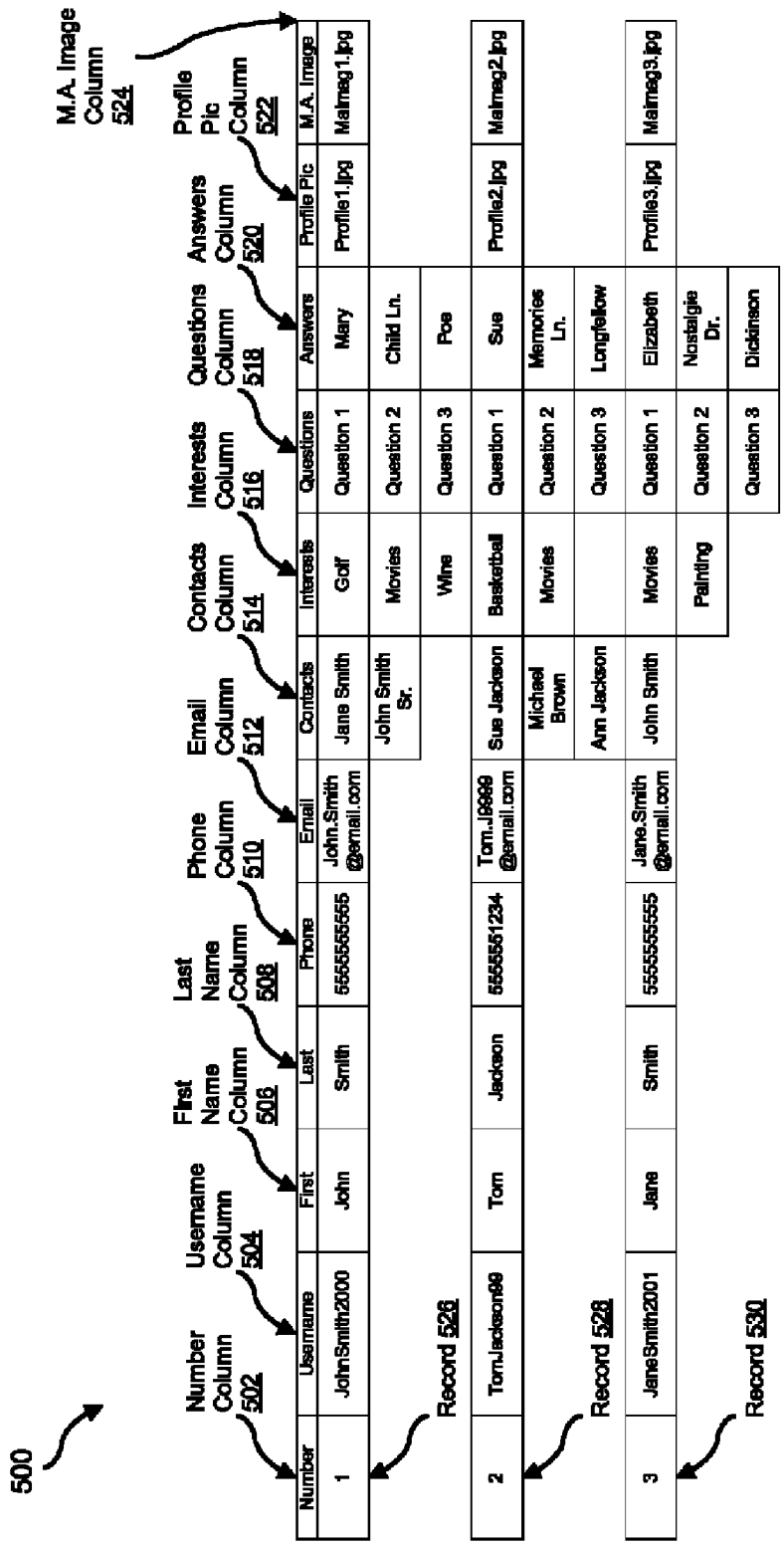
FIG. 5 is a block diagram of an exemplary database.

Mutual assurance images and other user-associated information may be stored in a database, such as exemplary database 500 in FIG. 5. For example, database 500 may include columns 504-524 corresponding to the username, first name, last name, phone number, email address, contacts, interests, questions, answers, profile picture, and mutual assurance image entered in fields 401-420 shown in FIG. 4. A storage module 120, as shown in FIG. 2, may store data into database 500 and/or into another storage unit in system 100 or connected to system 100. Database 500 may include one or more of databases 124-130 shown in FIG. 1, or the information included in those databases. Although not shown in FIG. 5 (due to size constraints), database 500 may also include a column for addresses entered into address field 406 and for passwords entered in the password field 422 of FIG. 4. Of course, columns may be switched for rows in database 500.

Database 500 may also include a number column 502 for indicating the number of each record in the database. For example, FIG. 5 shows that database 500 include three separate records 1-3 for three separate users, whose usernames are JohnSmith2000, TomJackson99, and JaneSmith2001.

The number of elements under each column for each user may differ. For example, JohnSmith2000 indicates three different interests (golf, movies, and wine), whereas TomJackson99 only indicates two different interests (basketball and movies). The number of elements under other columns may also differ, such as first name column 506, last name column 508, phone column 510, email column 512, contacts column 514, questions column 518, answers column 520, profile pic column 522, and mutual assurance image column 524.

Database 500 shows one example of how items of information may be stored in association with each other for different users in system 100. For example, the first name "John" is stored in association with username "JohnSmith2000" in record 1, and not in association with username "TomJackson99" in record 2 or "JaneSmith2001" in record 3.

Returning to FIG. 3, at step 304, one or more of the systems described herein may modify the mutual assurance image based on a prompt message to create a modified image that displays the prompt message. For example, at step 304, image modification module 106 in server 206 may modify the mutual assurance image to include the prompt message.

Image modification module 106 may modify the mutual assurance image in a variety of ways. For example, image modification module 106 may modify the mutual assurance image so that the prompt message is displayed in either normal or distorted form. Image modification module 106 may distort the image of the prompt message so that optical character recognition (OCR) systems have difficulty recognizing the prompt message. Then image modification module 106 may lay the distorted prompt message over the mutual assurance image. Alternatively, image modification module 106 may lay the prompt message over the mutual assurance image without distortion. Alternatively, or in addition, image modification module 106 may modify an image of the prompt message (or the prompt image) based on the mutual assurance image.

Distorting an image of the prompt message so that OCR systems have difficulty recognizing the prompt message may be described as a CAPTCHA process. A CAPTCHA process may generally refer to any process that helps to authenticate to a system that a user is a human being (as opposed to a bot, program, or script, etc.). For example, human beings can generally recognize a prompt message even when the prompt message has been distorted so that OCR systems have difficulty recognizing the message.

CAPTCHA systems are not limited to those based on the limitations of OCR technology. For example, a CAPTCHA system may display a question message, without distorting the message, if it includes a question that computing systems generally cannot answer. For example, modern computers may generally have difficulty parsing and correctly answering various common-sense questions. The instant disclosure contemplates embodiments in which the prompt message may not be distorted but may still serve as a CAPTCHA system that distinguishes human users from non-human users.

The prompt message may include any sequence of characters. For example, the prompt message may be based on user-related information. User-related information may include any of the information that the user indicates when setting up the user profile (as discussed regarding FIG. 4). More generally, user-related information may include any information specific to the user, such as the user's contact information, interests, challenge-response data, password, etc.

The prompt message may also be based on information not related to a user. For example, the prompt message may be based on a task that most humans can readily perform. For example, the prompt message may include at least one random word, or collection of characters, which are displayed in a distorted format in a CAPTCHA process. The prompt message may also be based on a common-knowledge challenge-response question not specific to a particular user, such as "What is the capital city of France?" A system that generates a large enough number of such common-knowledge questions may be effective in preventing non-human users from accessing system 100 because those non-human users may have difficulties systematically answering those questions correctly.

Image modification module 106 may also, or alternatively, modify the mutual assurance image based on a prompt image that does not contain or otherwise display a message (as opposed to a prompt message). For example, instead of modifying the mutual assurance image based on the prompt message "bicycle," image modification module 106 may modify the mutual assurance image based on a prompt image of a bicycle.

Image modification module 106 is not limited to embodiments that simply overlay the image of the prompt message over the mutual assurance image. Image modification module 106 may shrink, expand, crop, distort, or otherwise modify either or both of the image of the prompt message (or the prompt image) and the mutual assurance image to generate the modified mutual assurance image. For example, image modification module 106 may overlay only the characters of the prompt message over the mutual assurance image (as opposed to overlaying a rectangular block image of the prompt message). Image modification module 106 may also crop the mutual assurance image to the shape of the characters of the prompt message. A variation of image modification module 106 may also simply concatenate the mutual assurance image and the image of the prompt message (or prompt image) adjacent to each other. Image modification module 106 may make portions of either or both of the mutual assurance image and the image of the prompt message (or the prompt image) transparent or translucent so that, when the images are at least partially overlaid, portions of the lower image appear through the transparent portions of the higher image. In general, image modification module 106 may modify and combine the mutual assurance image and the image of the prompt message (or the prompt image) in any manner to create a modified image that at least partially provides the functions of mutual assurance and user authentication.

At step 306 of FIG. 3, one or more of the systems described herein may display the modified mutual assurance image. For example, display module 108 in computing system 202 may display the modified mutual assurance image in a user authentication phase after a user profile setup phase.

Display module 108 may display the modified mutual assurance image in a variety of ways. For example, during the user authentication phase, the user may proceed through a series of graphical user interfaces to accomplish user authentication. One of these graphical user interfaces may display the modified mutual assurance image.

Figure 7:
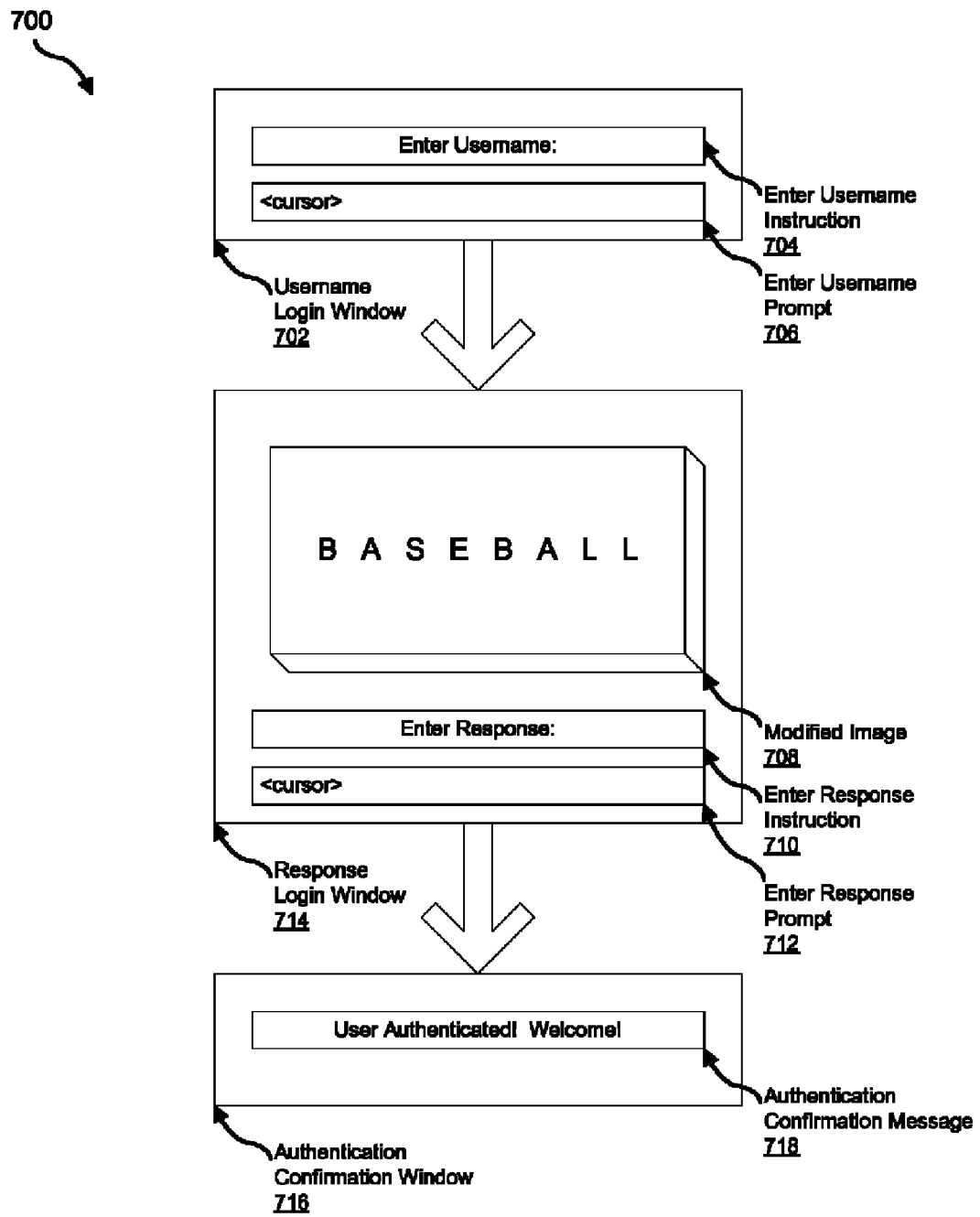
FIG. 7 is an exemplary series of graphical user interfaces for authenticating users.

As an example, FIG. 7 shows an exemplary series of graphical user interfaces 700 for authenticating a user. The series may begin with a username login window 702. Display module 108 may display an enter username instruction 704 in username login window 702. An enter username prompt 706 may follow the enter username instruction 704. Enter username prompt 706 may include a cursor where the user may enter the user's username.

The instant disclosure is not limited to embodiments in which the username types in a verbatim username into enter username prompt 706. Rather, system 100 may identify a username in any manner that picks out a unique username. For example, the user may designate a username through mouse, voice, or other input means. The user may also select the username from a list of possible usernames. Also, system 100 may automatically identify a username based on information previously or automatically transmitted from the user's computing device. For example, system 100 may identify a user's username based on a cookie stored in the user's computing device. In general, system 100 may identify a candidate username in any manner that identifies a unique string of characters, or other data, as the user's username. Username login window 702 may be modified or omitted in accordance with how system 100 identifies the candidate username.

After the user enters a candidate username into the enter username prompt 706 in username login window 702, system 100 may determine whether the candidate username is recognized. If the candidate username is not recognized as a known username (i.e. as a username previously registered under username column 504 in database 500), then system 100 may reject the user's attempt to log into the system. For example, system 100 may grant the user another opportunity to enter a candidate username, or may forbid the user from further interacting with system 100 (e.g., depending on how many times the user has previously failed to identify a recognized username).

As shown in FIG. 7, after the user enters a candidate username into the enter username prompt 706, and after system 100 determines that the candidate username is recognized, system 100 may proceed to display a response login window 714. Display module 108 may display the modified mutual assurance image 708 in response login window 714. In some embodiments, a response login window may appear within the same window that displays a username prompt after a user enters a username. Alternatively, a response login window may be displayed in a different window (e.g., a new window that replaces a window that displayed a username prompt).

As shown in FIG. 7, the prompt message "BASEBALL" may be laid over the mutual assurance image. The prompt message "BASEBALL" features an unusual font in FIG. 7 to represent that the prompt message may be distorted. For example, the prompt message may be distorted in a CAPTCHA process, as described above. Alternatively, the prompt message may be displayed without distortion. In that case, the prompt message may still serve as a CAPTCHA by requiring the user to respond to the non-distorted message in a manner difficult for modern computers to respond (e.g., by asking one of a large number of common sense questions that humans, but not computers, can easily answer). System 100 may also combine OCR-based CAPTCHA and non-OCR-based CAPTCHA processes, such as CAPTCHA processes based on common sense questions. Alternatively, the prompt may not be distorted and may not provide a robust CAPTCHA function. In that case, the prompt message may serve at least the function of obscuring significant portions of the mutual assurance image, so that the image may not easily be copied.

Although the mutual assurance image beneath the prompt message may be shown as white for simplicity in FIG. 7, the mutual assurance image may be any arbitrary image. Arbitrary examples of mutual assurance images include, for example, the Mona Lisa, a picture of a hawk, and a picture of a sunset.

As noted above, a prompt image, without a character message, may be substituted for the image of the prompt message. For example, image modification module 106 may overlay a picture of a baseball, instead of the prompt message "BASEBALL," over the mutual assurance image. As another example, image modification module 106 may overlay a picture of a house, instead of the prompt message "HOUSE," over the mutual assurance image.

Returning to FIG. 3, at step 308 one or more of the systems described herein may receive user input in response to the prompt message. For example, input module 110 in computing system 202 may receive the user input.

Input module 110 may receive the user input in a variety of ways. For example, Input module 110 may receive a string of characters typed by the user in response to the displaying of the modified mutual assurance image.

The series of graphical user interfaces 700 shown in FIG. 7 illustrate how input module 110 may receive the user input. In response login window 714, display module 108 may display an enter response instruction 710 together with the modified mutual assurance image. Enter response instruction 710 may instruct the user to enter an expected response, in reply to the prompt message displayed in modified mutual assurance image 708. Display module 108 may also display an enter response prompt 712. The user may enter a response at the cursor location in enter response prompt 712.

As with enter username prompt 706, the instant disclosure is not limited to embodiments in which the user types in a verbatim response into enter response prompt 712. Rather, system 100 may identify a response in any manner that picks out a unique response from the user. For example, the user may designate an expected response through mouse, voice, or any other suitable input mechanism. The user may also select the response from a list of possible expected responses.

Returning to FIG. 3, at step 310, one or more of the systems described herein may determine that the user input includes an expected response to the prompt message. For example, determination module 112 may determine whether the user input includes the expected response.

Determination module 112 may make the determination in a variety of ways. For example, determination module 112 may receive the username's password and the prompt message as inputs. Based on those inputs, determination module 112 may then compute an expected answer according to a predetermined set of rules. Although the formula for computing the expected answer based on the password and prompt message may be arbitrary, and arbitrarily complex, the rules may generally be kept simple for ease of use. For example, one formula for computing the expected answer from the password and prompt message may be to simply append one of these items to the other. In other embodiments, formulas for computing expected responses may be more complex.

After computing and/or obtaining the expected response based on the password and prompt message, determination module 112 may then compare the response with the expected response. Based on the comparison, determination module 112 may then determine whether the response sufficiently indicates the expected response so as to allow the user to be authenticated. Whether the response sufficiently indicates the expected response may depend upon a measure of similarity. As an example, determination module 112 may determine whether the response and expected response are the same, or whether one contains the other. Alternatively, determination module 112 may determine that the response scores a certain value X on a measure of similarity to the expected response. Determination module 112 may then determine whether the value X is sufficiently high (e.g., beyond a threshold Y) over which the response may be considered sufficiently similar to the expected response, so as to indicate the expected response.

As an alternative to determination module 112 computing the expected response after the user enters the response in step 308 of FIG. 3, the determination module may simply refer to a copy of the expected response previously calculated (e.g., before the user login phase) and stored in memory. For example, an expected response database may store combinations of password, prompt message, and expected response. The expected response database may be combined with database 500 of FIG. 500, so that records in database 500 include at least one prompt message and expected response. That is, database 500 may also include columns for prompt messages and expected responses in addition to the columns 502-524 shown in FIG. 5. Alternatively, the database for storing expected responses and the database 500 may be stored separately.

FIG. 8 shows an example of a database 800. Database 800 may include columns 801-803 for storing passwords, prompt messages, and expected responses, respectively. Each of the rows 804-820 may indicate a different possible combination of password, prompt message, and expected response.

A row 804 shows an example of how the expected response may be based on the prompt message alone. That is, row 804 may indicate that the user may be authenticated based on something other than a password. In row 804, the prompt message and the expected response are both "Wolfgang." Thus, system 100 may modify the mutual assurance image based on the prompt message "Wolfgang." In response, the user may enter a response. Determination module 112 may then determine whether the response sufficiently indicates the expected response "Wolfgang" (e.g., whether the response is sufficiently similar to "Wolfgang"). Because the prompt message and the expected response are the same in row 804, the example of row 804 may benefit from distorting the image of the prompt message "Wolfgang" or otherwise implementing a CAPTCHA process.

Rows 806 and 808 show examples of how system 100 may base the expected response on appending one of the password and the prompt message to the other. In rows 806 and 808, the password is "Wolfgang" and the prompt message is "Baseball." In row 806, the prompt message "Baseball" is appended to the password "Wolfgang." Conversely, in row 808, the password "Wolfgang" is appended to the prompt message "Baseball."

Rows 810-814 show examples of how determination module 112 may consider variations of the expected response in row 806 ("WolfgangBaseball") to also be expected responses. As shown in FIG. 8, these variations may be stored separately in database 800 as additional, registered expected responses. Alternatively, only the expected response "WolfgangBaseball" may be stored in database 800, and determination module 112 may determine that "Wolfgang-Baseball," "WolfgangBasebal," and "WolfgangBaseballl" are sufficiently similar to "WolfgangBaseball," as stored in row 806, without determination module 112 separately storing those variations as expected responses.

The expected response of row 810, "Wolfgang-Baseball" differs from the expected response of row 808, "Wolfgang-Baseball," because "Wolfgang-Baseball" contains an extra hyphen between the words "Wolfgang" and "Baseball." Similarly, the expected response of row 812, "WolfgangBasebal" is missing the last "l" of the word "Baseball." Similarly, the expected response of row 814, "WolfgangBaseballl," includes an additional "l." In each of these examples, determination module 112 may determine that the responses are sufficiently similar to "WolfgangBaseball" to allow the user to be authenticated.

A row 816 shows an example of how the prompt message may be substituted with a prompt image. In row 816, the prompt message of the previous rows 804-814, "Baseball," is replaced with an image of a baseball. However, the expected response of row 816 remains the same as row 808, "WolfgangBaseball." That is, instead of simply appending the verbatim prompt message to the user's password, the user may be expected to determine the name or label for the prompt image (e.g., "Baseball" for a picture of a baseball) and then append that name or label to the user's password. Because the example of row 816 features a prompt image that includes no characters, the prompt image may be effective in combating efforts to use Optical Character Recognition to undermine the user authentication and/or CAPTCHA process.

A row 818 shows another example of how system 100 may create or otherwise determine an expected response based on the user's password and the prompt message. Row 818 shows a slightly more complicated example in which the characters of the password "Wolfgang" are interspersed, one after the other, with the characters of the prompt message "Baseball." Row 818 only shows one slightly more complicated example of the formula for computing the expected response. The expected response may also be calculated according to any formula of arbitrary complexity, with the caveat that simpler formulas may make system 100 easier to use.

A row 820 shows another example of a slightly more complicated formula for determining the expected response based on the password and the prompt message. In row 820, the password and the prompt message are both numbers in the form of character strings. That is, the password of row 820 is the character string "Two" and the prompt message is "Three." Further, the expected response of row 820 is "Five." Thus, to determine the expected response, a user or system must (i) convert the character strings to numbers, (ii) perform a mathematical operation on the numbers (in this case, simple addition), and then (iii) convert the result of the mathematical operation back into characters. The conversion from characters to numbers and back, in addition to the mathematical formula, may help serve as a CAPTCHA because modern computers may have difficulty generalizing the performance of these operations over arbitrary numbers and mathematical formulae of increasing complexity.

Although only columns for the password, prompt message, and the expected response are shown in FIG. 8, database 800 may also include a column designating a mutual assurance image. For example, a user may designate multiple user assurance images. The expected response for the same password and the same prompt message may then differ depending on which mutual assurance image is shown. For example, in system 100, a user may be associated with two mutual assurance images: (i) an image of a house and (ii) an image of a sunset. Database 800 may then include a column for mutual assurance images. In the database, under the mutual assurance image column, there may be rows for both the image of the house and the image of the sunset. The expected response for the same password and the same prompt message may then differ depending on which mutual assurance image is displayed. For example, if the password is "Wolfgang" and the prompt message is "Baseball," then the expected response may be "WolfgangBaseballHouse" for the image of the house and "WolfgangBaseballSunset" for the image of the sunset.

Because the expected response may be calculated in a variety of different manners, as shown in FIG. 8, the enter response instruction 710 of FIG. 7 may provide guidance for how the user should calculate the expected response based on the password and the prompt message. For example, for row 806 of FIG. 8, the enter response instruction 710 may prompt the user to "append the prompt message to your password."

Attackers who read a plain language enter response instruction 710 (such as "append the prompt message to your password") may readily understand the formula for calculating the expected response. Accordingly, the enter response instruction may also provide guidance in coded form for how to calculate the expected response. For example, the enter response instruction could provide a simple code (such as "PRPW") for appending the password to the prompt message, and a simple code (such as "PWPR") for appending the prompt message to the password. These are merely examples and any arbitrary code may be used to guide the user on how to compute the expected response using any arbitrary formula. System 100 may also randomly select the formula for computing the expected response from a plurality of formulae, during each user authentication attempt, so that attackers will have difficulty determining what the correct formula may be.

Returning to FIG. 3, at step 312 one or more of the systems described herein may authenticate the user based on the determination of step 310. For example, authentication module 114 in server 206 may authenticate the user.

Authentication module 114 may authenticate the user in a variety of ways. As an example, display module 108 in computing system 202 may first display the modified mutual assurance image. Then, as shown in FIG. 7, display module 108 may display the modified mutual assurance image including the prompt message "Baseball" of row 806 in FIG. 8. In response, the user may enter the response "Wolfgang-Baseball." Determination module 112 may then determine that the response "WolfgangBaseball" sufficiently indicates the expected response "WolfgangBaseball" of row 806 (in this example, they are identical). Based on that determination, authentication module 114 may then authenticate the user. For example, authentication module 114 may instruct display module 108 to display an authentication confirmation message 718, as in the authentication confirmation window 716 shown in FIG. 7 and provide access for the user to system 100.

Figure 9:
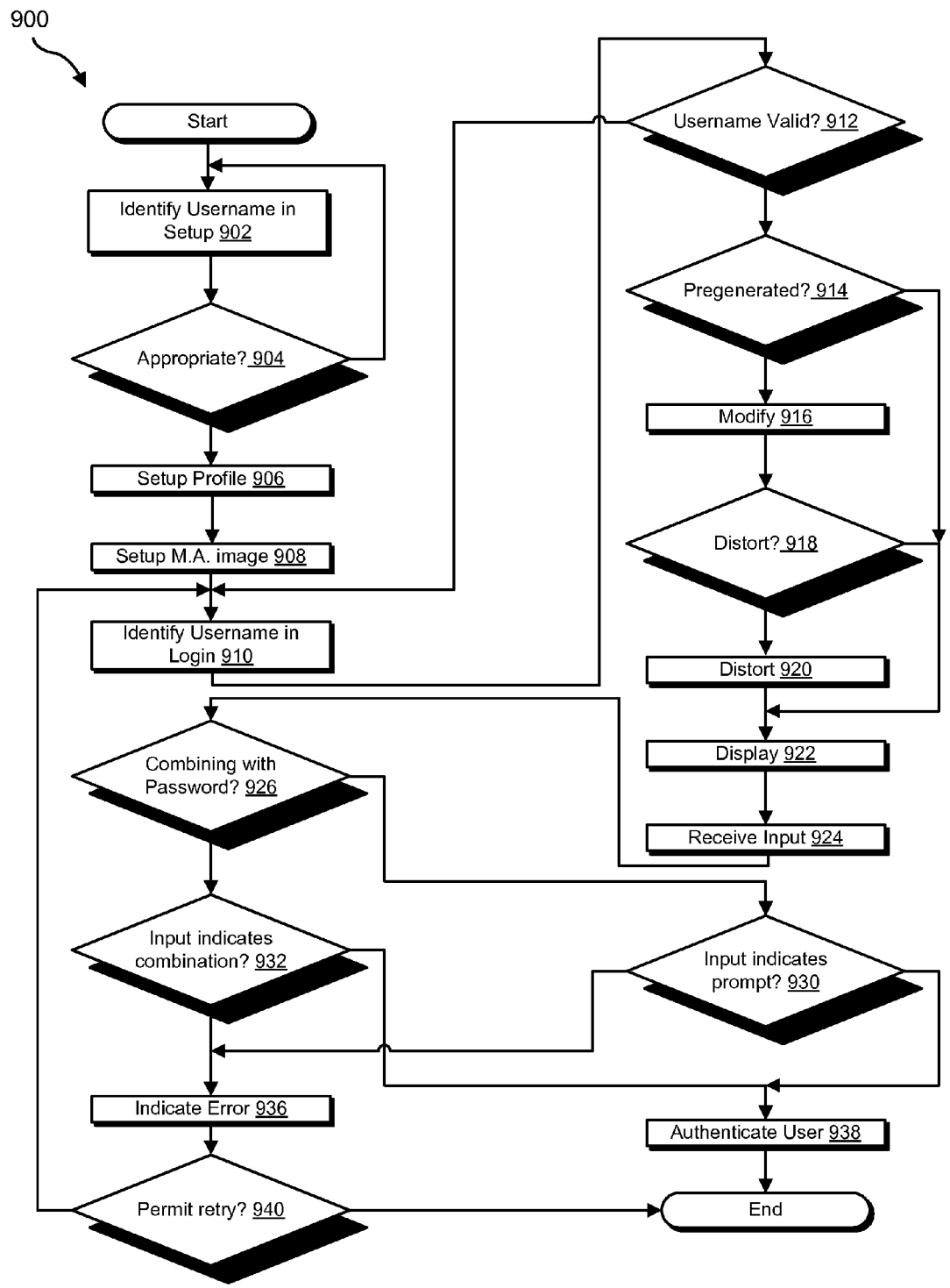
FIG. 9 is a flow diagram of an exemplary method for authenticating users.

FIG. 9 is a flow diagram of an exemplary method for authenticating users. The steps shown in FIG. 9 may be performed by any suitable computer-executable code and/or computing system. In some embodiments, the steps shown in FIG. 9 may be performed by one or more of the components of system 100 in FIG. 1 and/or system 200 in FIG. 2.

FIG. 9 illustrates an exemplary flow chart for authenticating a user according to certain embodiments of the instant disclosure. As illustrated in FIG. 9, at step 902 one or more of the systems described herein may identify a candidate username in a setup phase. For example, at step 902, a username identification module may, as part of server 206, allow a user to enter a candidate username.

Next, at step 904, one or more of the systems described herein may determine whether the candidate username is appropriate. For example, a username registration module in server 206 may determine whether the candidate username was previously registered with system 100. Registration of a username may refer to system 100 saving information about the username to indicate that the username was previously identified and allowed to access system 100, provided that the corresponding user can later authenticate himself or herself. For example, server 206 may store information about registered users in usernames and passwords database 124, mutual assurance images database 126, profile data database 128, and challenge-response data database 130. In contrast, system 100 may not store any information regarding non-registered usernames, and therefore not recognize those usernames, not authenticate those usernames, and/or not allow users to attempt to login using those usernames.

The username registration module may also determine whether the username satisfies requirements of form. For example, the user registration module may determine whether the characters of the candidate username are of a sufficient number and kind. System 100 may also implement any other arbitrary rule for allowing or disallowing candidate usernames to be registered with the system. If the candidate username fails to satisfy any of the above conditions, or other conditions, at step 904, the method may allow the user to try again by returning to step 902. Alternatively, system 100 may disallow the user from further attempting to access the system.

If the username registration module determines at step 904 that the candidate username is appropriate and satisfies all of the system's rules for username registration, then the username registration module may register the username. The method may then proceed to step 906.

At step 906, one or more of the systems described herein may allow the user to setup a user profile. For example, a profile setup module within server 206 may instruct computing system 202 to present the user with a graphical user interface for setting up a profile.

The graphical user interface for setting up a profile may correspond to graphical user interface 400 shown in FIG. 4. Alternatively, the graphical user interface may separate the input of various fields into sequential screens or windows, as in a profile setup wizard. The graphical user interface may provide any combination of fields and screens so that a user may enter the information to setup a user profile with system 100.

After setting up the user profile at step 906, the method may then proceed to step 908. At step 908, one or more of the systems described herein may allow the user to setup a mutual assurance image. For example, image identification module 104 may identify a mutual assurance image. Image identification module 104 may user a graphical user interface, such as graphical user interface 600 shown in FIG. 6, for identifying the mutual assurance image. Alternatively, image identification module 104 may generate or otherwise identify a mutual assurance image without the user selecting or designating a mutual assurance image. Image identification module 104 and/or another module in system 100 may associate the mutual assurance image with the user. Image identification module 104 may associate the user and mutual assurance image together by saving those items together in a database record, or other data structure, that indicates their pairing. For example, image identification module 104 may store information indicating both the username and the mutual assurance image together in the same record in database 500, as shown in FIG. 5.

Steps 902-908 may include a user configuration phase. The order of steps 902-908 may be largely interchangeable. For example, instead of the order shown in FIG. 9, the username registration module may only determine whether the username is appropriate, and will be registered, after the user sets up a profile and mutual assurance image.

After the user configuration phase, the method may proceed to a user login phase. The user login phase may begin at step 910. At step 910, one or more of the systems described herein may identify a candidate username for logging in to system 100. For example, a username identification module in server 206 may identify the candidate username. The username identification module may identify candidate usernames in both the user configuration and the user login phase. Alternatively, two separate modules may be used.

The username identification module may allow a user to input a candidate username. For example, the username identification module may instruct computing system 202 to output a graphical user interface such as username login window 702 shown in FIG. 7. Alternatively, the user may input the candidate username through voice, mouse, or any other input method.

After identifying a candidate username at step 910, the method may proceed to step 912. At step 912, one or more of the systems described herein may determine whether the username is valid. For example, determining whether the username is valid may include determining whether the username is registered (e.g., previously registered by the username registration module during the user configuration phase and stored in a database such as database 500 shown in FIG. 500).

If system 100 determines that the candidate username is not valid at step 912, then the method may provide the user with another opportunity to login by returning to step 910. Alternatively, system 100 may disallow the user from further attempting to login (e.g., if the user has failed to login a sufficient number of times). If system 100 determines that the candidate username is valid, then the method may proceed to step 914.

At step 914, one or more of the systems described herein may determine whether the mutual assurance image associated with the user has been previously modified for presenting to the user during the user login phase. If the modified mutual assurance image has been previously generated, then the method may proceed directly to step 922, where the pre-generated modified mutual assurance image may be displayed. For example, display module 108 in computing system 202 may display the pre-generated image.

At step 914, if system 100 determines that the mutual assurance image for the user has not been previously generated, then the method proceeds to step 916. At step 916, one or more of the systems described herein may modify the mutual assurance image based on a prompt message to create a modified mutual assurance image that displays the prompt message. For example, image modification module 106 in server 206 may modify the mutual assurance image based on a prompt message.

After modifying the mutual assurance image, the method may proceed to step 918. At step 918, one or more of the systems described herein may determine whether the modified mutual assurance image is to be distorted. For example, a distortion module in server 206 may determine whether the modified mutual assurance image is to be distorted. If the determination is negative, then the method may proceed to step 922.

At step 918, if the determination is positive, the method may proceed to step 920. At step 920, one or more of the systems described herein may distort the mutual assurance image. The same distortion module that determined whether to distort the image at step 918 may also distort the image. Alternatively, separate modules may be used to determine whether to distort the modified mutual assurance image and actually distort that image. The distortion module may distort the modified mutual assurance image in an Optical Character Recognition (OCR) based CAPTCHA process, so that OCR systems have difficulty recognizing the characters of the prompt message. Alternatively, the distortion module may otherwise distort the prompt message and/or any other part of the modified mutual assurance image (e.g., the entire image).

At step 922, one or more of the systems described herein may display the modified mutual assurance image. For example, display module 108 in computing system 202 may display the modified mutual assurance image. Display module 108 may display the modified mutual assurance image by displaying a graphical user interface, such as response login window 714, including the modified mutual assurance image 708, as shown in FIG. 7. From step 922, the method proceeds to step 924.

At step 924, one or more of the systems described herein may receive user input. For example, input module 110 in computing system 202 may receive the user input. Input module 110 may receive the user input through a graphical user interface, such as response login window 714 shown in FIG. 7. For example, input module 110 may receive user input entered into enter response prompt 712 in response login window 714. The user input may include a response. After receiving the user input at step 924, the method may proceed to step 926.

At step 926, one or more of the systems described herein may determine whether the expected response includes the prompt message or instead includes a combination of the user's password and the prompt message. Row 804 indicates an example of how the expected response may include the prompt message. Rows 806-820 indicate examples of how the expected response may include a combination of the password and the prompt message.

If the expected response includes the prompt message, as in row 804 of FIG. 8, then the method may proceed to step 930. If the expected response includes a combination of the user's password and the prompt message, as in rows 806-820 of FIG. 8, then the method may proceed to step 932.

At step 930, one or more of the systems described herein may determine whether the user input sufficiently indicates the prompt message. For example, determination module 112 in server 206 may determine whether the user input sufficiently indicates the prompt message. Determination module 112 may base the determination on a degree of similarity between the expected response and the response that was entered by the user.

At step 932, one or more of the systems described herein may determine whether the user input sufficiently indicates a combination of the user's password and prompt message. As in step 930, determination module 112 in server 206 may determine whether the user input sufficiently indicate the combination. The particular combination of the user's password and prompt message may be stored as a expected response, such as those shown in expected response column 803 shown in FIG. 8. Determination module 112 may base the determination on a degree of similarity between the expected response and the response that was entered by the user.

At both steps 930 and 932, if the user input does not sufficiently indicate the expected response, the method may proceed to step 936. At step 936, one or more of the systems described herein may indicate that an error has occurred. For example, display module 108 in computing system 202 may display a message indicating that the user's input is incorrect and that the login process has failed. From step 936, the method may then proceed to step 940.

At step 940, the one or more of the systems described herein may determine whether the user is allowed another attempt to login. As in steps 904 and 912, the determination may be based on whether the user has reached a sufficient number of failed login attempts. Alternatively, the determination may be based on any other criteria. At step 940, if the user is allowed another attempt to login, the method may return to step 910. If the user is not allowed another attempt to login, the method may end.

At both steps 930 and 932, if the user input does sufficiently indicate the expected response, the method may proceed to step 938. At step 938, one or more of the systems described herein may authenticate the user. For example, authentication module 114 in server 206 may authenticate the user. Upon authenticating the user, display module 108 in computing system 202 may display an authentication confirmation message, such as authentication confirmation message 718 shown in FIG. 7. After step 938, the method may proceed to the end step.

The steps in the user authentication phase do not necessarily need to be performed in the exact order shown in FIG. 9. For example, the decisions at steps 914, 918, and 926, may be performed earlier, and the remainder of the method can proceed in accordance with the decision outcomes. For example, the determination of whether the image is to be distorted could be made earlier in the process. The remainder of the method could then proceed according to whether the image is to be distorted or not.

Alternatively, certain steps may be omitted. For example, in embodiments in which the modified mutual assurance image is never distorted, steps 918 and 920 may be omitted. Similarly, in embodiments in which the modified mutual assurance image is never pre-generated, step 914 may be omitted.

Figure 10:
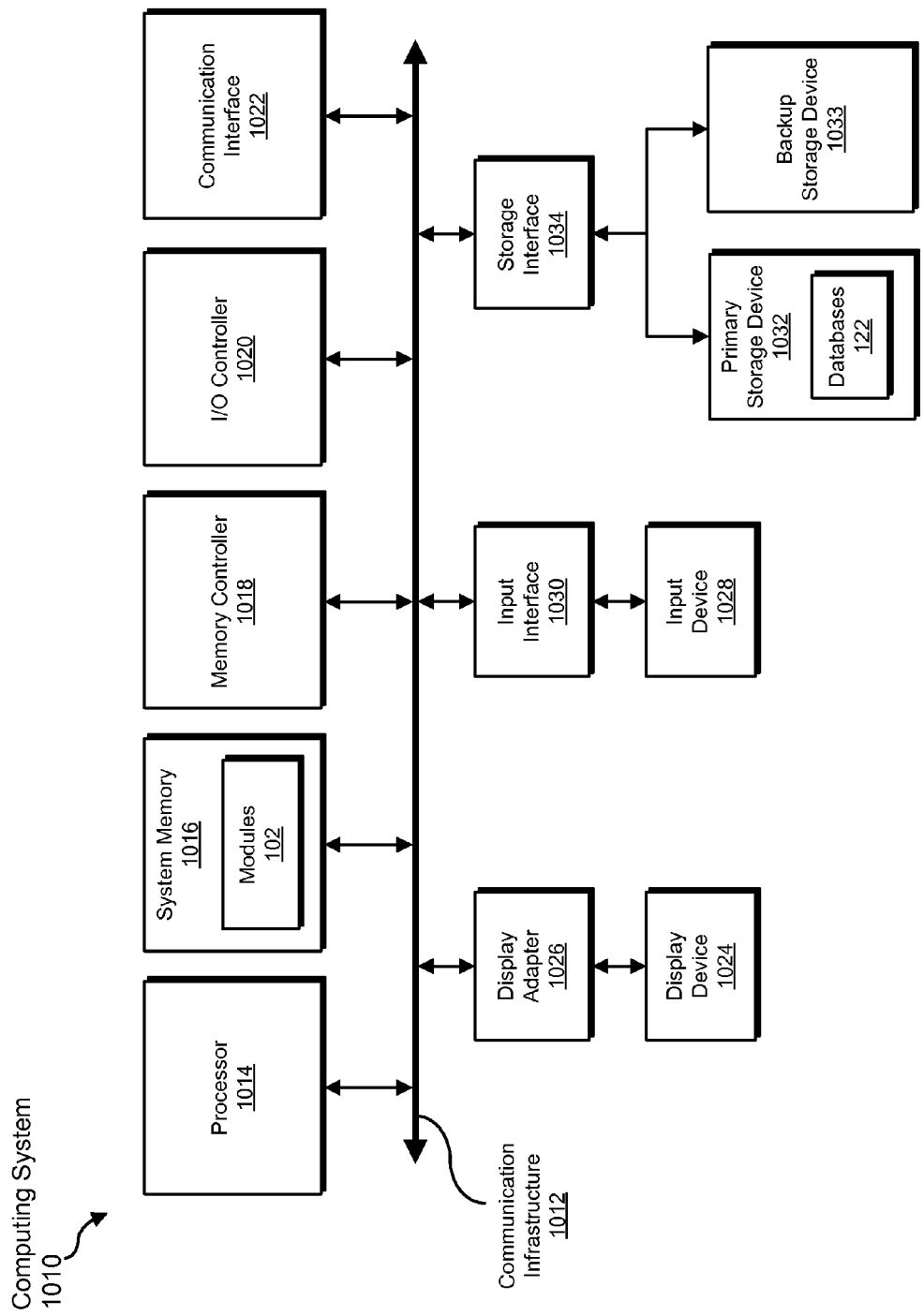
FIG. 10 is a block diagram of an exemplary computing system capable of implementing one or more of the embodiments described and/or illustrated herein.

FIG. 10 is a block diagram of an exemplary computing system 1010 capable of implementing one or more of the embodiments described and/or illustrated herein. Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may include at least one processor 1014 and a system memory 1016.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the exemplary embodiments described and/or illustrated herein. For example, processor 1014 may perform and/or be a means for performing, either alone or in combination with other elements, one or more of the identifying, modifying, displaying, receiving, determining, appending, authenticating, and/or storing steps described herein. Processor 1014 may also perform and/or be a means for performing any other steps, methods, or processes described and/or illustrated herein.

System memory 1016 generally represents any type or form of volatile or non-volatile storage device or medium capable of storing data and/or other computer-readable instructions. Examples of system memory 1016 include, without limitation, random access memory (RAM), read only memory (ROM), flash memory, or any other suitable memory device. Although not required, in certain embodiments computing system 1010 may include both a volatile memory unit (such as, for example, system memory 1016) and a non-volatile storage device (such as, for example, primary storage device 1032, as described in detail below). In one example, one or more of modules 102 from FIG. 1 may be loaded into system memory 1016.

In certain embodiments, exemplary computing system 1010 may also include one or more components or elements in addition to processor 1014 and system memory 1016. For example, as illustrated in FIG. 10, computing system 1010 may include a memory controller 1018, an input/output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an ISA, PCI, PCIe, or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012. In certain embodiments, memory controller 1018 may perform and/or be a means for performing, either alone or in combination with other elements, one or more of the steps or features described and/or illustrated herein, such as identifying, modifying, displaying, receiving, determining, appending, authenticating, and/or storing.

I/O controller 1020 generally represents any type or form of module capable of coordinating and/or controlling the input and output functions of a computing device. For example, in certain embodiments I/O controller 1020 may control or facilitate transfer of data between one or more elements of computing system 1010, such as processor 1014, system memory 1016, communication interface 1022, display adapter 1026, input interface 1030, and storage interface 1034. I/O controller 1020 may be used, for example, to perform and/or be a means for performing, either alone or in combination with other elements, one or more of the identifying, modifying, displaying, receiving, determining, appending, authenticating, and/or storing steps described herein. I/O controller 1020 may also be used to perform and/or be a means for performing other steps and features set forth in the instant disclosure.

Communication interface 1022 broadly represents any type or form of communication device or adapter capable of facilitating communication between exemplary computing system 1010 and one or more additional devices. For example, in certain embodiments communication interface 1022 may facilitate communication between computing system 1010 and a private or public network including additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution. In certain embodiments, communication interface 1022 may perform and/or be a means for performing, either alone or in combination with other elements, one or more of the identifying, modifying, displaying, receiving, determining, appending, authenticating, and/or storing steps disclosed herein. Communication interface 1022 may also be used to perform and/or be a means for performing other steps and features set forth in the instant disclosure.

As illustrated in FIG. 10, computing system 1010 may also include at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, exemplary computing system 1010 may also include at least one input device 1028 coupled to communication infrastructure 1012 via an input interface 1030. Input device 1028 generally represents any type or form of input device capable of providing input, either computer or human generated, to exemplary computing system 1010. Examples of input device 1028 include, without limitation, a keyboard, a pointing device, a speech recognition device, or any other input device. In at least one embodiment, input device 1028 may perform and/or be a means for performing, either alone or in combination with other elements, one or more of the identifying, modifying, displaying, receiving, determining, appending, authenticating, and/or storing steps disclosed herein. Input device 1028 may also be used to perform and/or be a means for performing other steps and features set forth in the instant disclosure.

As illustrated in FIG. 10, exemplary computing system 1010 may also include a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a floppy disk drive, a magnetic tape drive, an optical disk drive, a flash drive, or the like. Storage interface 1034 generally represents any type or form of interface or device for transferring data between storage devices 1032 and 1033 and other components of computing system 1010. In one example, databases 122 from FIG. 1 may be stored in primary storage device 1032.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also include other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

In certain embodiments, storage devices 1032 and 1033 may be used, for example, to perform and/or be a means for performing, either alone or in combination with other elements, one or more of the identifying, modifying, displaying, receiving, determining, appending, authenticating, and/or storing steps disclosed herein. Storage devices 1032 and 1033 may also be used to perform and/or be a means for performing other steps and features set forth in the instant disclosure.

Many other devices or subsystems may be connected to computing system 1010. Conversely, all of the components and devices illustrated in FIG. 10 need not be present to practice the embodiments described and/or illustrated herein. The devices and subsystems referenced above may also be interconnected in different ways from that shown in FIG. 10. Computing system 1010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1010 may be configured as an application specific integrated circuit (ASIC) adapted to implement one or more of the exemplary embodiments disclosed herein.

Figure 11:
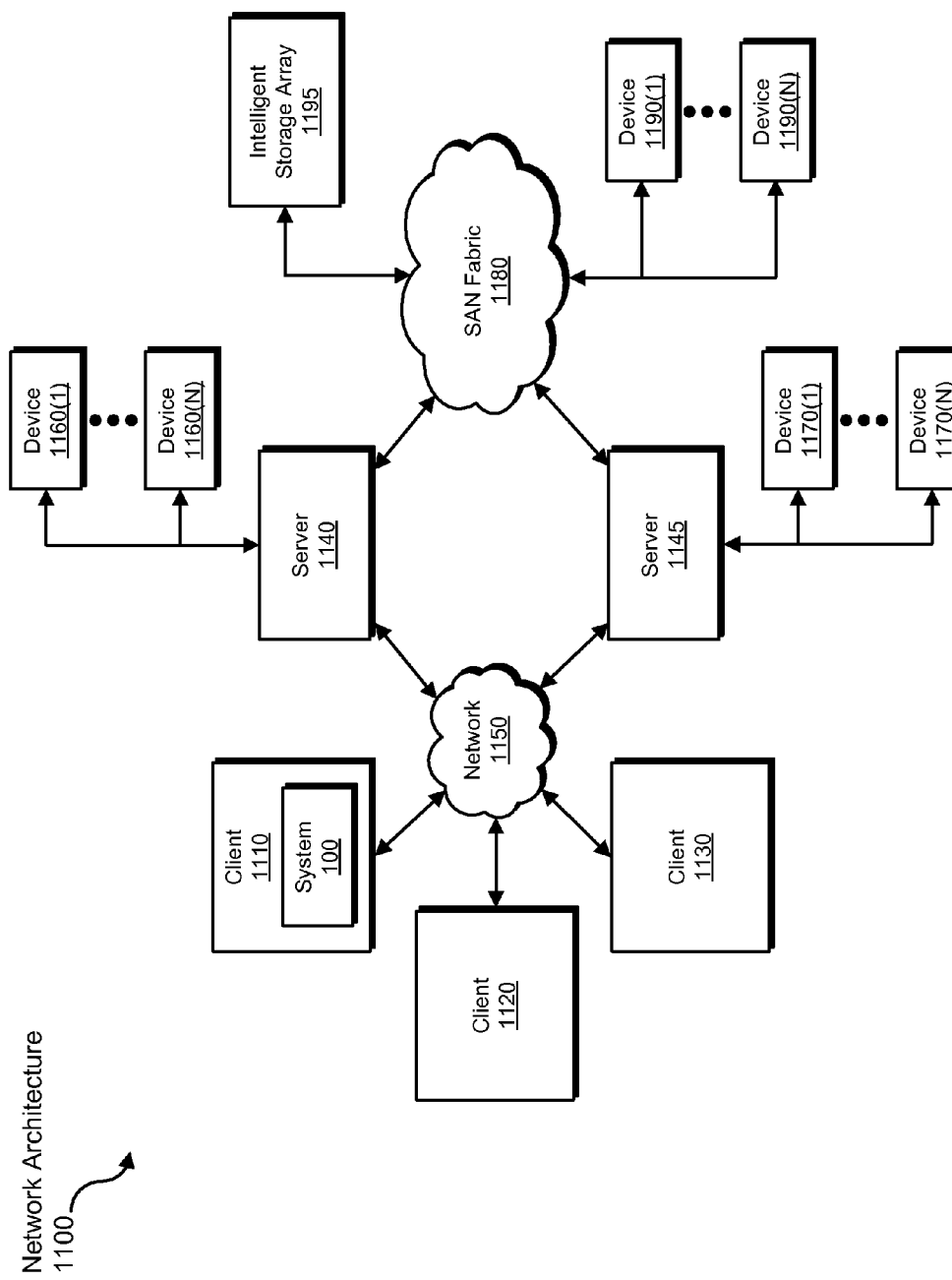
FIG. 11 is a block diagram of an exemplary computing network capable of implementing one or more of the embodiments described and/or illustrated herein.

FIG. 11 is a block diagram of an exemplary network architecture 1100 in which client systems 1110, 1120, and 1130 and servers 1140 and 1145 may be coupled to a network 1150. Client systems 1110, 1120, and 1130 generally represent any type or form of computing device or system, such as exemplary computing system 1010 in FIG. 10. In one example, client system 1110 may include system 100 from FIG. 1.

Similarly, servers 1140 and 1145 generally represent computing devices or systems, such as application servers or database servers, configured to provide various database services and/or run certain software applications. Network 1150 generally represents any telecommunication or computer network including, for example, an intranet, a wide area network (WAN), a local area network (LAN), a personal area network (PAN), or the Internet.

As illustrated in FIG. 11, one or more storage devices 1160(1)-(N) may be directly attached to server 1140. Similarly, one or more storage devices 1170(1)-(N) may be directly attached to server 1145. Storage devices 1160(1)-(N) and storage devices 1170(1)-(N) generally represent any type or form of storage device or medium capable of storing data and/or other computer-readable instructions. In certain embodiments, storage devices 1160(1)-(N) and storage devices 1170(1)-(N) may represent network-attached storage (NAS) devices configured to communicate with servers 1140 and 1145 using various protocols, such as NFS, SMB, or CIFS.

Servers 1140 and 1145 may also be connected to a storage area network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to exemplary computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the exemplary embodiments disclosed herein may also be encoded as a computer program, stored in server 1140, run by server 1145, and distributed to client systems 1110, 1120, and 1130 over network 1150. Accordingly, network architecture 1100 may perform and/or be a means for performing, either alone or in combination with other elements, one or more of the identifying, modifying, displaying, receiving, determining, appending, authenticating, and/or storing steps disclosed herein. Network architecture 1100 may also be used to perform and/or be a means for performing other steps and features set forth in the instant disclosure.

As detailed above, computing system 1010 and/or one or more components of network architecture 1100 may perform and/or be a means for performing, either alone or in combination with other elements, one or more steps of an exemplary method for authenticating users.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, image modification module 106 may transform data by modifying a mutual assurance image based on a prompt message, as discussed above.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for authenticating users, at least a portion of the method being performed by a computing device comprising at least one processor, the method comprising:
during a user configuration phase:
receiving a selection of an image to be used for mutual assurance with a user, and
associating the image with the user by providing information that identifies the image in a profile of the user;
identifying the image associated with the user;
modifying the image based on a prompt message to create a modified image that displays the prompt message by overlaying the prompt message over the image to create the modified image;
identifying, within the profile of the user, user-related information that is specific to the user;
during a user login phase:
displaying the modified image, identifying a password associated with the user, wherein the password is distinct from the user-related information, receiving user input from the user provided in response to the prompt message, determining that the user input comprises an expected response to the prompt message, wherein the expected response includes a combination of the password and the user-related information and at least one of the prompt message and the expected response is based on the user-related information, and authenticating the user based on the determination.

2. The computer-implemented method of claim 1, wherein receiving a selection of an image to be used for mutual assurance with a user comprises receiving, from the user, the selection of the image.

3. The computer-implemented method of claim 1, wherein the expected response comprises at least one of:
the user-related information appended to the password;
the password appended to the user-related information.

4. The computer-implemented method of claim 1, wherein:
the user configuration phase comprises at least one of setting up the profile of the user or modifying the profile of the user.

5. The computer-implemented method of claim 1, wherein the expected response comprises the user-related information combined with the password.

6. The computer-implemented method of claim 1, wherein the prompt message comprises the user-related information.

7. The computer-implemented method of claim 1, further comprising:
identifying a candidate username;
determining that the candidate username is a registered username, wherein the registered username is associated with the mutual assurance image and the mutual assurance image is displayed in response to the determining that the candidate username is a registered username.

8. The computer-implemented method of claim 1, further comprising displaying instructions to the user for how to combine the user-related information and the password to create the expected response.

9. The computer-implemented method of claim 8, wherein:
determining that the user input comprises the expected response comprises determining that the user input combines the user-related information and the password in the manner described in the instructions to the user.

10. The computer-implemented method of claim 1, further comprising, during the user configuration phase:
receiving a user name from the user;
storing the user name and the mutual assurance image in a data structure indicating pairing of the user name and the mutual assurance image.

11. A system for authenticating users, the system comprising:
a profile setup module programmed to, during a user configuration phase:
receive a selection of an image to be used for mutual assurance with a user, and
associate the image with the user by providing information that identifies the image in a profile of the user;
an image identification module programmed to identify the image associated with the user for mutual assurance during an authentication process;
an image modification module programmed to modify the image based on a prompt message to create a modified image that displays the prompt message by overlaying the prompt message over the image to create the modified image;
a user-related information identification module programmed to identify, within the profile of the user, user-related information that is specific to the user;
a display module programmed to display the modified image;
a password identification module programmed to, during a user login phase, identify a password associated with the user;
an input module programmed to receive user input from the user provided in response to the prompt message;
a determination module programmed to, during the user login phase, determine that the user input comprises an expected response to the prompt message, wherein the expected response includes a combination of the password and the user-related information and at least one of the prompt message and the expected response is based on the user-related information;
an authentication module programmed to authenticate the user based on the determination;
at least one processor configured to execute the profile setup module, the image identification module, the image modification module, the user-related information identification module, the display module, the password identification module, the input module, the determination module, and the authentication module.

12. The system of claim 11, wherein the profile setup module is programmed to receive the selection of the mutual assurance image by receiving a selection of a profile picture from the user and using the profile picture as the mutual assurance image.

13. The system of claim 11, wherein the user-related information comprises information provided by the user during the user configuration phase.

14. The system of claim 11, wherein the image modification module is programmed to modify the image based on the prompt message to create the modified image by cropping the image to a shape of characters of the prompt message.

15. The system of claim 11, wherein:
the determination module is programmed to determine that the user input comprises the expected response to the prompt message by determining that the user input, while not exactly matching the expected response, is sufficiently similar to the expected response.

16. The system of claim 15, wherein the user input is sufficiently similar to the expected response when the user input only differs from the expected response by one character.

17. The system of claim 11, wherein the image modification module is programmed to distort the prompt message such that the modified image displays the distorted prompt message.

18. The system of claim 11, wherein:
the profile setup module is programmed to, during the user configuration phase, receive selections of a plurality of images to be used for mutual assurance with the user, the plurality of images comprising the mutual assurance image;
the determination module is programmed to identify a different expected response for each image in the plurality of images.

19. A non-transitory computer-readable-storage medium comprising one or more computer-executable instructions that, when executed by at least one processor of a computing device, cause the computing device to:

during a user configuration phase:
  receive a selection of an image to be used for mutual assurance with a user, and
  associate the image with the user by providing information that identifies the image in a profile of the user;
identify the image associated with the user;
modify the image based on a prompt message to create a modified image that displays the prompt message by overlaying the prompt message over the image to create the modified image;
identify, within the profile of the user, user-related information that is specific to the user;
during a user login phase:
  display the modified image,
  identify a password associated with the user, wherein the password is distinct from the user-related information,
  receive user input from the user provided in response to the prompt message,
  determine that the user input comprises an expected response to the prompt message, wherein the expected response includes a combination of the password and the user-related information and at least one of the prompt message and the expected response is based on the user-related information, and
  authenticate the user based on the determination.

* * * * *